F. Shenton,
Slate-Frame Joint,
No. 40,858. Patented Dec. 8, 1863.
Fig: 1. Fig: 2.
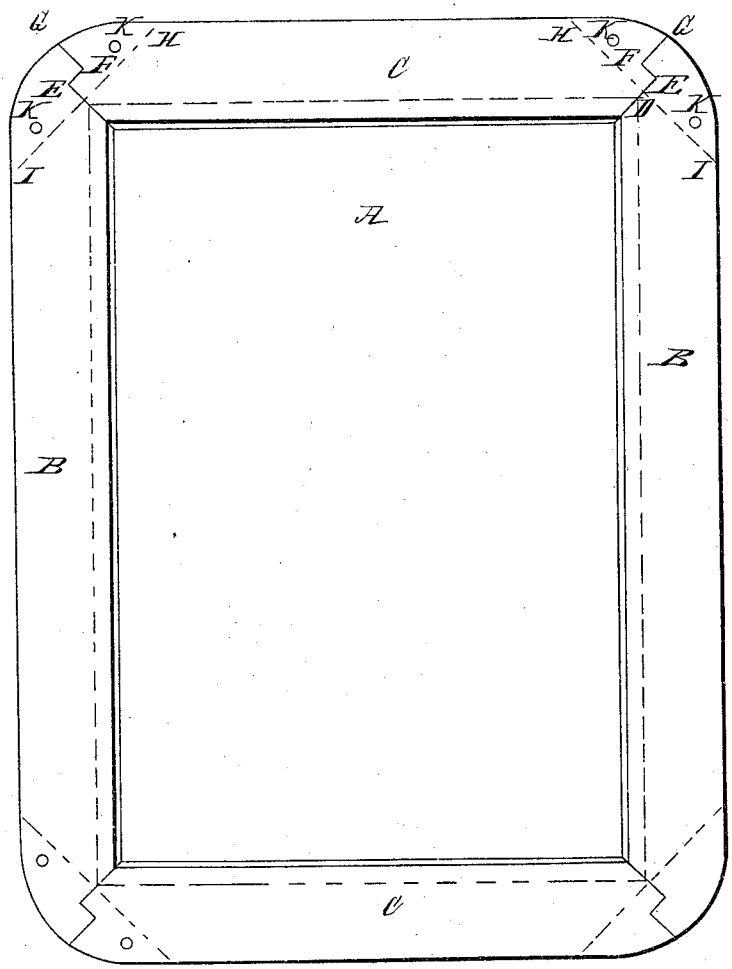
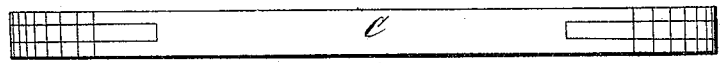
Fig: 3.
Witnesses:
C. Hadaway
Robt Goggin
Inventor:
Francis Shenton
By his Attorney J. Dennis Jr

UNITED STATES PATENT OFFICE.

FRANCIS SHENTON, OF SLATINGTON, PENNSYLVANIA.

IMPROVEMENT IN JOINTS FOR SLATE AND OTHER FRAMES.

Specification forming part of Letters Patent No. 40,858, dated December 8, 1863.

*To all whom it may concern:*

Be it known that I, FRANCIS SHENTON, of Slatington, in the county of Lehigh and State of Pennsylvania, have invented a new and useful Joint for Slate and other Frames; and I do hereby declare that the same is described and represented in the following specifications and drawings.

To enable others skilled in the art to make and use my new and improved joint, I will proceed to describe its construction and the mode of making it, referring to the drawings, in which the same letters indicate like parts in each of the figures.

Figure 1 is the plan of a frame with my new joints. Fig. 2 is the edge, and Fig. 3 the end, of the frame.

The nature of my new joint for slates and other frames consists in making the joint in the peculiar manner described in this specification and shown in the drawings.

In the accompanying drawings, A is the slate; B B, the sides, and C C the ends, of the frame which surrounds the slate. The joints of this frame are formed by cutting the sides and ends on an angle of about forty-five degrees or miter-line D about one-half the width of the frame, then cutting them at about a right angle to the miter-line D on the line E F, and then from F to G on a line parallel to the miter-line D, as shown in the drawings, Fig. 1, so that they will fit together. After the ends are fitted, as above described, I cut a score or groove across the corner in the edge of the frame about down to the groove that receives the slate, as shown by the dotted line H I, and fit in the spline or piece J, which may be glued in and further secured by the pins K K, so as to make a firm strong joint, capable of great resistance, and pressure applied to the sides crowds the joints together, which is a great advantage and convenience in clamping up the frames, saving both time and labor, and thereby lessening the cost and making the frame cheaper. At the same time I cut the joints I cut off the extreme corners, so as not to groove through them, and after the joint is put together I round off the corner, as shown in the drawings. I do not intend to confine the lines of the joint to an angle of forty-five degrees or miter, but to vary them whenever it shall be desirable or advantageous to do so.

I believe I have described and represented my improved joint so as to enable any person skilled in the art to make and use it.

I will now state what I desire to secure by Letters Patent—to wit:

I claim—

A joint formed by notching the sides and ends, as described, in combination with the spline or piece J and pins K K.

FRANCIS SHENTON.

Witnesses:
   HENRY KUNTZ,
   L. D. KRAUSE.